UNITED STATES PATENT OFFICE.

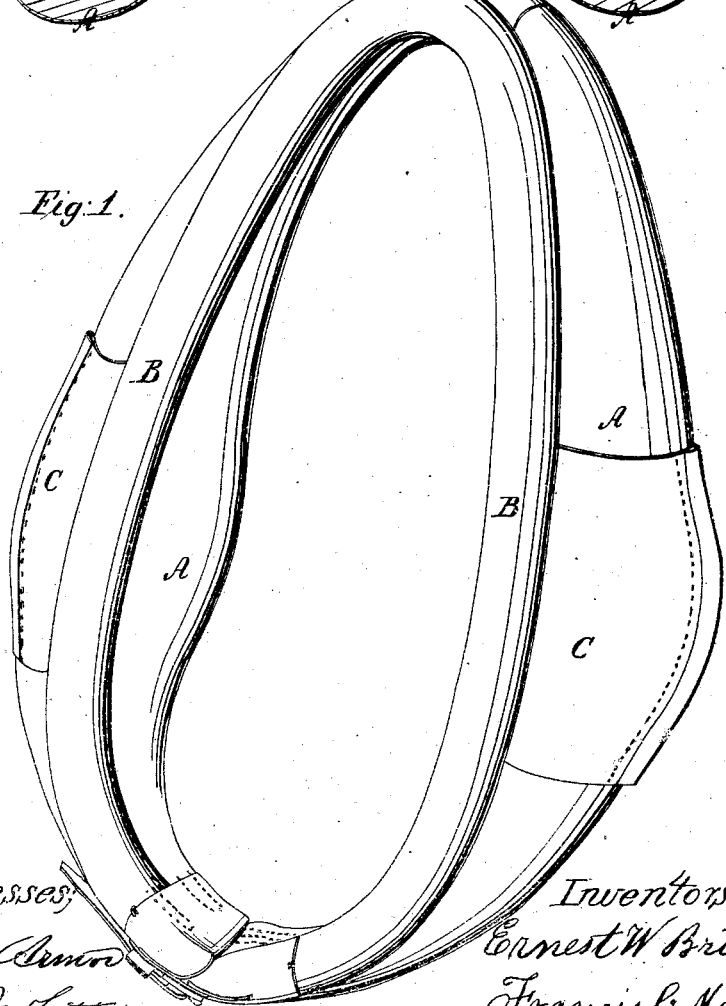

E. W. BRIDING AND F. G. MAXWELL, OF BALTIMORE, MARYLAND.

HORSE-COLLAR.

Specification of Letters Patent No. 30,715, dated November 27, 1860.

*To all whom it may concern:*

Be it known that we, ERNEST W. BRIDING and FRANCIS G. MAXWELL, of the city of Baltimore and State of Maryland, have invented a new and useful Improvement in Horse-Collars, being a New Article of Manufacture; and we do hereby declare that the following is a full, clear, and exact description thereof, reference being had to the accompanying drawing of the same, making part of this specification, in which—

Figure 1 represents a view in perspective of a horse collar made of glazed canvas, and otherwise embracing our improvements; Fig. 2 represents a section of the same taken through the lug pieces on which the hame irons rest; showing more particularly the water proof lining of the leather lugs and that part of the collar made of leather round which the hames are clamped.

We are aware that various attempts have been made to supersede the use of leather in whole or in part in the manufacture of horse collars, with a view to lessen their expense and prevent the galling of the horse. To obtain these desirable advantages, collars have been made of felt or felted cloth, and more recently duck cloth has been used for the same purpose. We have discovered that the use of such materials does not answer the purpose, as they possess still greater objections in their use and appearance than those resulting from the use of leather collars.

It is well known that collars made of felt or duck cloth will absorb freely the perspiration and vapor from the horse, and this, instead of tending to lessen the chafing and galling of the horse, we have found to produce the very cause which most generally effects it. Moreover, in rainy weather the water will penetrate the duck cloth, and the straw will become completely saturated, and being closely packed in the collar will retain the water, and remain wet for a long time.

Among the chief causes in producing galling is the working of the stuffing of the collar into hard knots or bunches so as to render the surface of the collar lumpy or more unyielding at one point than at another, and it is well known, that this lumpy condition of the stuffing will be produced much sooner when liable to get wet, either from perspiration, or rain, than from any other cause. Further, the stuffing in a wet or damp condition rots rapidly, and the pressure of the hames on the collar will tend to squeeze the water from the rotten straw through the interstices of the duck cloth, and thereby stain it, and by the dampness of the straw also cause the material to rot. All these objections and others, will result from the use of such material as felt or duck cloth in the manufacture of horse collars. It is also obvious that the white duck cloth will soon become blackened with dirt and dust from the street and horse, and in a short time rendered unsightly in appearance and unfit for use.

In the present instance we have made that portion of the collar to which the hames are clamped of leather, but as this material will absorb water in rainy weather and cause the straw to become more or less wet, we interpose between the leather and the straw stuffing a lining of glazed canvas to render that portion of the collar when made of leather also impervious to water. This lining is sewed in by the same thread which secures the leather to the neck and shoulder relieving part of the collar.

The collar is fitted with the usual leather lugs upon which the hame irons rest; and as these leather pieces will get wet from rain, they will rot, that portion of the collar to which they are sewed. To remedy this therefore, we interpose between each leather piece and the surface of the collar a lining of glazed canvas of the same size as the lug and sewed to the collar with it. In this way, we produce a canvas collar every part of which is impervious to water, almost entirely free from liability to rot, and having the appearance of patent leather.

We prefer to have the collar made open below instead of above, by which the collar is not so liable to break as when made to open above the neck of the horse.

In the accompanying drawings A represents the shoulder and neck relieving portion of the collar made of glazed canvas; B the rib to which the hames are clamped, made in this case of leather, and fitted with a lining *a* of water proof canvas; C the leather lugs for the hame irons, and *c* the water proof lining thereof.

The collar may be made in any of the usual ways, and the glazed canvas may be made double instead of single as represented, for even when thus made double, the collar will cost much less than when made of leather.

This new article of manufacture has a great advantage over all others, because it can be varnished when required, to preserve its luster, without increasing its liability to break or split.

What we claim as our invention and desire to secure by Letters Patent, is—

Constructing horse collars of glazed canvas and leather in the manner and for the purpose specified.

In testimony whereof we have hereunto subscribed our names.

ERNEST W. BRIDING.
   FRANCIS G. MAXWELL.

Witnesses:
 GEO. F. ARMOR,
 B. F. PARLETT.